United States Patent [19]

Bodovsky et al.

[11] Patent Number: 4,710,207

[45] Date of Patent: Dec. 1, 1987

[54] AIR FILTERING APPARATUS WITH ROLLER ASSEMBLY FOR CLEANING

[75] Inventors: Paul W. Bodovsky, Sherman; Donald H. Rodgers, Dennison, both of Tex.

[73] Assignee: Continental Conveyor & Equipment Co., Inc., Winfield, Ala.

[21] Appl. No.: 575,132

[22] Filed: Jan. 30, 1984

Related U.S. Application Data

[63] Continuation of Ser. No. 415,867, Sep. 8, 1982, abandoned, which is a continuation of Ser. No. 248,148, Mar. 30, 1981, abandoned.

[51] Int. Cl.$^4$ .............................................. B01D 46/04
[52] U.S. Cl. ........................................ 55/290; 55/296; 55/301
[58] Field of Search .................. 55/114, 290, 296, 301, 55/304, 351, 400; 210/386, 396; 209/229, 390; 15/265.52

[56] References Cited

U.S. PATENT DOCUMENTS

| | | | |
|---|---|---|---|
| 1,410,038 | 3/1922 | Stacy | 55/351 |
| 3,525,198 | 8/1970 | Neitzel | 55/272 |
| 4,213,794 | 7/1980 | Wooding et al. | 15/256.52 |
| 4,294,597 | 10/1981 | Archer et al. | 55/290 |
| 4,319,831 | 3/1982 | Matsui et al. | 15/256.52 |

FOREIGN PATENT DOCUMENTS 7959  1/1894  Fed. Rep. of Germany ... 15/256.52

Primary Examiner—David L. Lacey
Attorney, Agent, or Firm—Pearne, Gordon, McCoy & Granger

[57] ABSTRACT

Apparatus to remove dust, fibers, lint or other undesirable particles from air. Air ladened with dust, lint or other undesirable matter is drawn into a filtering housing to contact the surface of a rotatable screen-covered drum. The air passes through the drum while the particles remain on the drum surface. The air passes from a higher pressure area exterior of the drum into a lower pressure area within the center of the drum and is conveyed away. The particles are retained on the exterior surface of the drum which is covered by the fine mesh screen. The particles, which form a bat, are then separated from the rotating drum surface by being moved into contact with a smooth compressor roll cooperating with a flighted doffing to lift away the bat from the drum and drop it to a collection zone.

A supplemental doffing roll with rigid flights is rotated parallel to the axes of the compression roll and flighted doffing roll in such manner as to interfere with the rotation of urethane flights of the doffing roll. This insures complete removal and discharge of the bat to the collection zone.

1 Claim, 3 Drawing Figures

AIR FILTERING APPARATUS WITH ROLLER ASSEMBLY FOR CLEANING

This case is a continuation of application Ser. No. 415,867 filed Sept. 8, 1982, now abandoned which is a continuation of application Ser. No. 248,148, filed Mar. 30, 1981, now abandoned.

BACKGROUND OF THE INVENTION

This invention relates to apparatus for separating and recovering particles such as dust, fibers and lint from carrier air. The atmosphere in and around textile and other treating facilities may often carry undesirable particles of this type. To remove and recover these particles, the air in such zones must be continually filtered. Various machines and methods have been designed to eliminate undesirable particles of these types from air in these zones. One such device is described in U.S. Pat. No. 3,525,198, issued Aug. 25, 1970 to Joseph C. Nietzel. Another approach is disclosed in the commercially available FIBR-A-FILTER ® air filtering system sold by The Continental Conveyor and Equipment Company, Inc. Both of these systems utilize a rotating screened drum, positioned with ducting which conveys unfiltered air from a high pressure zone to a clean air discharge zone of lower pressure. Both utilize the rotating drum for supporting a filtering screen for separating the air from the particles it carries. Both utilize a smooth compression roller in association with a doffing roller with urethane flights to remove product bat discharge from the rotating drum. And both utilize rubber air seals secured to the drum-containing housing. These seals contact the opposite circumferential ends of the drum to preclude particle laden air from passing into the center of the drum via the ends, rather than through the filtering screen.

SUMMARY OF THE INVENTION

An object of the instant invention is thus to increase the efficiency of known air filtering machines by insuring the more complete removal of particles from particle ladened air and to extend the useful life of parts of air filtering machines.

These and other objects of the present invention are obtained by a roller having rigid flights rotatable about an axis parallel with the smooth compression seal roller and the doffing roll with urethane flights. The relationship is such that the metal flights rotate in the same direction from the urethane flights of the doffing roll and in contact therewith. This action will provide a continuous cleaning and wiping action to the flighted doffing roll to preclude the movement of particles and bat from discharging back to sealing elements and towards the rotating drum to recontaminate the drum surface and, possibly, to cause a jamming of bat discharge and urethane flights in the sealing zone.

DESCRIPTION OF THE DRAWINGS

In the accompanying drawings which illustrate the invention.

DESCRIPTION OF THE PREFERRED EMBODIMENTS

Figure 1:
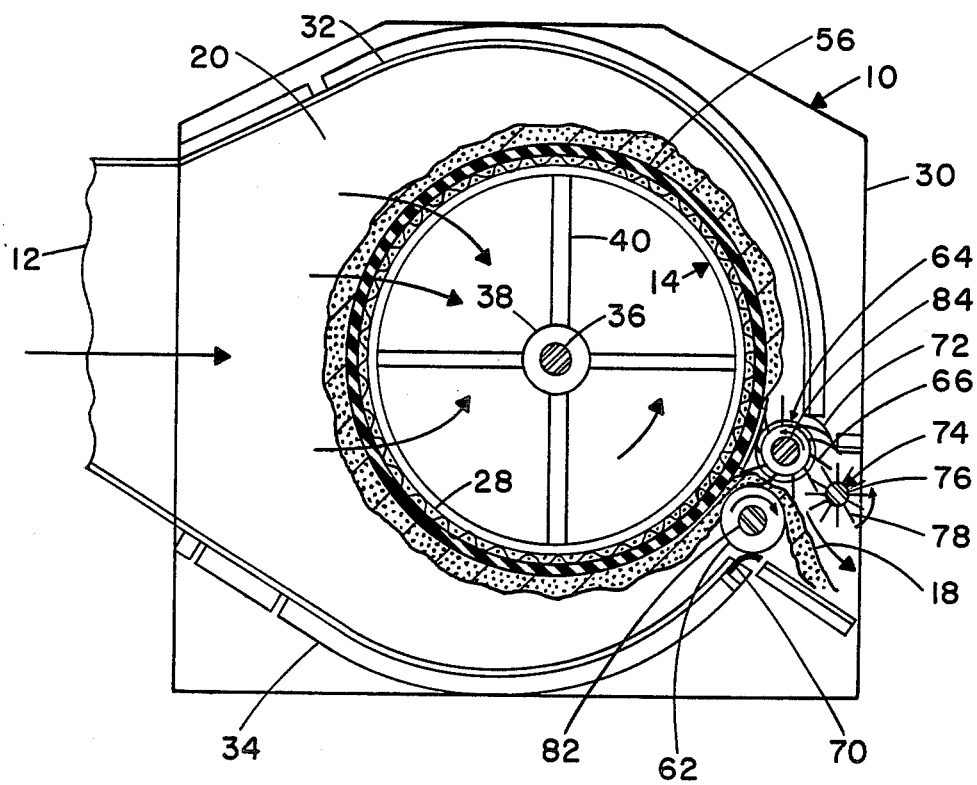
FIG. 1 is a side elevational view of air filtering machinery constructed in accordance with the instant invention with a part of the housing side frame removed to show internal constructions thereof.
Figure 2:
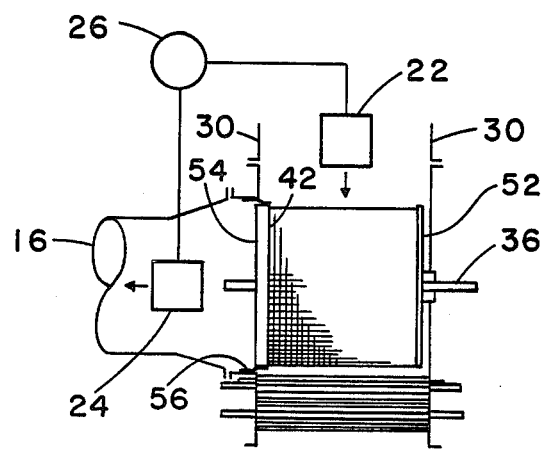
FIG. 2 is a top plan view of the air filtering machinery of FIG. 1 but with the housing top removed.

FIG. 1 shows a side elevational view of the basic elements of the air filtering system which constitutes the preferred embodiment for the utilization of the instant invention. At one end of the housing 10 is an air inlet duct 12, shown substantially radially with respect to the filtering drum 14, for drawing the particle ladened air into communication with the filtering drum 14 for cleaning. An outlet duct 16 is provided and shown substantially parallel with the axis of the rotatable drum for drawing away clean, filtered air from within the filtering drum and chamber 20 in which the drum is located. Suitable sensors 22 and 24 and drive means 26 are provided in association with the ducts for maintaining the proper pressure relationship between the inlet and the outlet ducts for causing the flow of particle ladened air to the drum and clean air from the interior of the drum.

A product bat discharge area is provided adjacent one segment of the rotating drum, shown for illustrative purposes at the four o'clock position in FIG. 1. By product bat it is meant the accumulated dust, lint and fibers or other particulate material removed from the incoming air, gathered on the screen 28 or other filtering media of the drum and removed to an accumulation zone.

The drum and ducts are supported in proper orientation with each other by side housing frames 30 and top and bottom housing frames 32 and 34 in airtight relationship except for communication with the ducts and product bat discharge and accumulation zone if external from the housing. Further, the drum interior must be appropriately sealed from the space within the housing to preclude the movement of particle ladened air through to a lower pressure zone, and to exterior of the machine other than through the cylindrical screen which constitutes the filter. This is desirable since all incoming air must be filtered through the screen surface of the rotating drum.

The drum is mounted on a rotating shaft 36 and journaled in side housing frames 30 of the housing. On this shaft 36 are a pair of bushings 38 held in position through set screws or other appropriate means. A plurality of spokes 40 are mounted to the bushing for supporting the end rings 42 of the drum which in turn mount a grid work of axial rods and rings to which is mounted the fine metal screen 28 for the filtering of the incoming air. Axial and cylindrical straps are held to the cagework structure of the drum and support the screen in the removable orientation with respect thereto for cleaning and replacement.

The air discharge end 54 and other end 52 of the drum are located adjacent the end surfaces of the housing with seal means 56 mounted to an appropriate housing part to contact the cylindrical ends of the rotating drum to preclude the movement of particle ladened air to the lower pressure zone and exit ducts through an avenue other than the filtering screen surface of the drum. This is because movement of particle ladened air to the lower pressure zone other than through the screen would permit particle ladened air to be removed from the system without the appropriate filtering action occurring. The preferred sealing means normally take the form of modified z-shaped rubber seals 56 secured by bolts and adhered to both ends of the housing adjacent the drum ends. They are positioned circumferentially entirely around and entirely in contact with each edge of the cylindrical drum surface.

Located adjacent one portion of the cylindrical drum surface is a smooth, metal compression seal roller 62 and the doffing roller 64 with flexible urethane flights 66 to effect removal of the product bat 18 from the drum surface. Such urethane flights 66 have forwardly disposed faces that contact the drum surface. Supplemental seals 70 and 72 extend the length of the drum adjacent these two rollers to preclude particle ladened air from escaping from the housing. The lower seal 70 is constructed of rubber and is mounted to the bottom frame member 34 in contact with a seal roller 62. The upper seal is a scroll seal and is constructed preferably of metal and contacts the flexible flights 66 of the doffing roller 64 to create an air seal in this area.

During the normal operation of prior art devices as described above, the bat of filtered product which accumulates on the revolving screen drum is discharged from the machine by means of a smooth compression roller and a flighted doffing roller. The discharge is a mere dropping at the bat to an accumulation zone therebeneath.

On occasion due to various reasons the product bat will not discharge and fall from the bat discharge zone along and following the normal discharge path as shown by the arrow but instead will stay attached to or follow the flighted doffing roller during its rotation. As a result of this action the seal scroll 72 may become clogged or damaged by the bat being forced by it through the sealing passage. Additionally the product bat may re-enter the machine to contact the drum and cause the machine to choke which will cause other damage and operational shutdown.

To prevent this action a supplemental wiper roll 74 has been devised and installed to prevent the discharging bat from following an abnormal path between the seal scroll, doffing roller 64 and the drum. The wiper roller, constructed of a rotating steel shaft 76 and rigid metal flights 78, or other rigid material, deflects and wipes each of the forwardly disposed faces of the flights of the doffing roller during mutual interaction of these sets of flights, preferably in the same direction with wiper roll operating at a greater speed. Due to this action the bat is not allowed to stay attached to the flighted doffing roller but is mechanically removed therefrom due to the location of the wiper roller and thus the product bat is forced to assume the normal discharge path. In the preferred orientation, the doffing roller flights deform when they contact the drum, roller seal, scroll and wiper roller. Remote from the drum the doffing roller flights contact the flights of the wiper roller with the wiper roller flights positioned to extend into the doffing flights to produce an adequate wiping action.

The wiper roller is constructed of a round notatable steel shaft 76 with a number of rigid bars or flights 78, preferably of steel, rigidly attached thereto and running longitudinal to the shaft length and perpendicular to the shaft centerline. The wiper roller's design and material is not limited to that described above.

Figure 3:
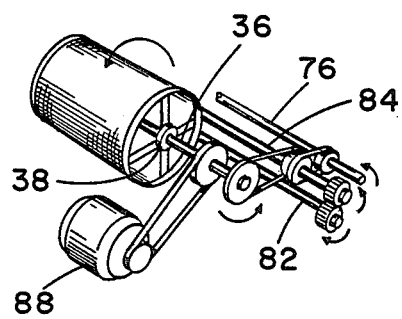
FIG. 3 is an isometric showing of the drum and associated rollers and drives.

The wiper roller is supported on both ends by means of bearings and is caused to rotate, as for example by means of a drive from the flighted roller. FIG. 3 illustrates the drive shafts for the drum, the seal roller shaft 82, the doffing roller shaft 84 and wiper roller shaft 76 with appropriate gears, chains and motor 88 for effecting their relative rotating motion one with respect to the other as shown by the arrows in FIG. 1.

While the instant invention is disclosed as being carried out in a preferred embodiment, it is not intended to be so limited but to be protected broadly within the spirit and scope of the appended claims.

We claim:

1. Apparatus for filtering air including a chamber, a drum mounted for rotation within said chamber, filtering media secured to the cylindrical surface of said drum, means to cause a flow of particle ladened air into said chamber and into contact with said filtering media and to cause a flow of clean air from within said drum to exterior of said drum and said chamber, means to remove bat formed of filtered particles from the filtered media on the surface of said drum including a compression seal roller mounted for rotation out of contact with said drum but at a distance to contact and remove bat therefrom, a doffing roller having flights made of flexible sheet material extending across the drum, each of said flights of said doffing roller having forwardly disposed faces, said doffing roller mounted for rotation to have said forwardly disposed faces of said flights contact said drum to assist in removing bat from said drum, a wiper roller having rigid flights made of sheet material extending across the wiper roller and mounted for rotation in the same direction as the flights of said doffing roller whereby said rigid flights will contact said forwardly disposed faces of said doffing roller to direct bat away from said doffing roller and to preclude bat from being rotatably transported back towards said filtering media on said drum surface by said doffing roller, and means to rotate said drum, doffing roller and wiper roller in a first direction of rotation and to rotate said seal roller in a direction of rotation opposite from said first direction of rotation.

* * * * *